(12) United States Patent
Berghaus et al.

(10) Patent No.: US 12,498,006 B2
(45) Date of Patent: Dec. 16, 2025

(54) BACKING PLATE FOR A DISK BRAKE OF A MOTOR VEHICLE AND METHOD FOR MANUFACTURING SAID BACKING PLATE

(71) Applicant: TMD Friction Services GmbH, Leverkusen (DE)

(72) Inventors: Frank Berghaus, Kürten (DE); Dirk Schneider, Odenthal (DE)

(73) Assignee: TMD Friction Services GmbH, Leverkusen (DE)

( * ) Notice: Subject to any disclaimer, the term of this patent is extended or adjusted under 35 U.S.C. 154(b) by 468 days.

(21) Appl. No.: 17/905,833

(22) PCT Filed: Mar. 9, 2021

(86) PCT No.: PCT/EP2021/055860
§ 371 (c)(1),
(2) Date: Sep. 8, 2022

(87) PCT Pub. No.: WO2021/180686
PCT Pub. Date: Sep. 16, 2021

(65) Prior Publication Data
US 2023/0151858 A1  May 18, 2023

(30) Foreign Application Priority Data
Mar. 9, 2020 (DE) .......................... 102020106296.6

(51) Int. Cl.
*F16D 65/097* (2006.01)

(52) U.S. Cl.
CPC .. *F16D 65/0976* (2013.01); *F16D 2200/0013* (2013.01); *F16D 2200/0021* (2013.01); *F16D 2250/0007* (2013.01); *F16D 2250/0023* (2013.01)

(58) Field of Classification Search
CPC ............ F16D 65/0975; F16D 65/0976; F16D 2250/0007; F16D 2200/0013; F16D 2200/0021; F16D 2250/0023
See application file for complete search history.

(56) References Cited

U.S. PATENT DOCUMENTS

| | | | |
|---|---|---|---|
| 3,958,667 A | 5/1976 | deGennes | |
| 4,537,291 A | 8/1985 | Thiel | |
| 4,901,825 A * | 2/1990 | Weiler | F16D 55/226 188/73.35 |

(Continued)

FOREIGN PATENT DOCUMENTS

| | | | |
|---|---|---|---|
| CN | 108980240 A | * | 12/2018 |
| DE | 3220632 A1 | | 12/1983 |

(Continued)

*Primary Examiner* — Robert A. Siconolfi
*Assistant Examiner* — Mahbubur Rashid
(74) *Attorney, Agent, or Firm* — Rogowski Law LLC (57) ABSTRACT

The invention relates to a backing plate (1) for a disc brake of a motor vehicle, comprising a front side (2) for holding a friction lining. The backing plate (1) has a back side (3), on which a holding device (4) is arranged. The holding device is designed to hold a spring element (5), which consists of a spring base (6) and two spring legs (7, 8) arranged at the ends of the spring base (6). The holding device (4) is integrally bonded to the backing plate (1). The invention further relates to a method for producing a backing plate (1).

13 Claims, 8 Drawing Sheets

(56) References Cited

U.S. PATENT DOCUMENTS

| | | | | |
|---|---|---|---|---|
| 5,067,594 | A | * | 11/1991 | Leidecker ............ F16D 55/2262 |
| | | | | 188/73.43 |
| 5,427,213 | A | | 6/1995 | Weiler |
| 5,494,140 | A | * | 2/1996 | Weiler ................. F16D 65/0979 |
| | | | | 188/73.38 |
| 6,179,095 | B1 | * | 1/2001 | Weiler ................. F16D 65/0979 |
| | | | | 188/73.38 |
| 6,267,206 | B1 | | 7/2001 | Grimme et al. |
| 6,634,469 | B2 | * | 10/2003 | Storzel ................ F16D 65/0977 |
| | | | | 188/73.38 |
| 9,657,793 | B2 | | 5/2017 | Sander |
| 2007/0170018 | A1 | | 7/2007 | Alexander |
| 2007/0215305 | A1 | | 9/2007 | Heider |
| 2015/0300431 | A1 | | 10/2015 | Florian et al. |
| 2016/0116009 | A1 | | 4/2016 | Falter |

FOREIGN PATENT DOCUMENTS

| | | | | | |
|---|---|---|---|---|---|
| DE | 8503491 | U | | 6/1986 | |
| DE | 4112947 | A1 | | 10/1992 | |
| DE | 4332709 | A1 | | 3/1995 | |
| DE | 19626299 | A1 | * | 1/1998 | |
| DE | 10159328 | A1 | | 9/2002 | |
| DE | 10351477 | B4 | | 6/2004 | |
| DE | 10350725 | A1 | | 6/2005 | |
| DE | 102013216592 | A1 | | 7/2014 | |
| DE | 19906804 | B4 | * | 8/2014 | ........... F16D 65/092 |
| DE | 102013008155 | A1 | | 11/2014 | |
| DE | 102014017684 | A1 | * | 6/2016 | |
| DE | 102019109498 | A1 | * | 10/2020 | ......... F16D 65/0979 |
| EP | 0731288 | A1 | | 9/1996 | |
| FR | 2252035 | A5 | | 9/1974 | |
| GB | 2147673 | A | * | 5/1985 | |
| GB | 2170873 | A | | 8/1986 | |
| JP | S58221025 | | | 12/1983 | |
| JP | H03113135 | A | | 5/1991 | |
| JP | H08170666 | A | | 7/1996 | |
| JP | 2016509657 | | | 3/2016 | |
| JP | 2018119622 | A | | 8/2018 | |
| RU | 2229044 | C2 | | 5/2004 | |
| RU | 2462328 | C2 | | 11/2011 | |
| WO | WO 0049307 | A1 | * | 8/2000 | |

* cited by examiner

BACKING PLATE FOR A DISK BRAKE OF A MOTOR VEHICLE AND METHOD FOR MANUFACTURING SAID BACKING PLATE

CROSS-REFERENCE TO RELATED APPLICATIONS

This application is a national stage application (under 35 USC § 371) of PCT/EP2021/055860, filed Mar. 9, 2021, which claims benefit of DE 102020106296.6, filed Mar. 9, 2020, the contents of each of which is incorporated by reference herein.

BACKGROUND OF THE INVENTION

Technical Field and State of the Art

The invention relates to a backing plate for a disc brake of a motor vehicle. Furthermore, the invention relates to methods for manufacturing such a backing plate.

Backing plates for disc brakes of a motor vehicle are known in a variety of ways. Backing plates are guided and supported in such disc brake devices in a shaft of the brake caliper or the brake carrier, respectively. The backing plate is adapted to absorb a brake pressure transmitted by a brake cylinder in order to transfer said brake pressure onto the brake disc. So that the backing plate is securely held in the shaft of the brake caliper or the brake carrier, respectively, hold-down springs are provided, which often engage on the upper side of the backing plate and are pretensioned radially against the backing plate and tangentially against the backing plate by means of a hold-down device. For example, backing plates with such hold-down springs are shown in DE 10 2013 008 155A1. A wire spring fora brake shoe arrangement in a floating caliper brake is known from DE 10 351 477 B4. The wire spring therein is supported by its circular coils in a recess of a backing plate for the brake shoe in order to prevent the brake shoe from rattling on the guides in the brake jaw arrangement.

It is an object of the invention to provide a backing plate wherein an alternative arrangement of the spring element is provided in order to minimize the logistical effort to inventory the required parts and also to simplify the fastening of the spring element to the backing plate. Furthermore, it is an object of the invention to provide a method for producing a backing plate according to the current invention.

SUMMARY OF THE INVENTION

The backing plate according to the invention for a disc brake of a motor vehicle, in particular a commercial vehicle, comprises a front side adapted to accommodate a friction lining. The backing plate according to the invention is characterized in that the backing plate has a back side on which a mounting device is arranged, which is adapted to accommodate a spring element consisting of a spring base and two spring legs arranged at the ends of the spring base. The spring element can be formed as a wire spring. The mounting device is in this case adapted to form a substance-to-substance bond (i.e., integrally bonded) to the back side of the backing plate. In particular, as defined by the invention, an inventive backing plate can also be claimed with such a spring element.

It is therefore particularly advantageous for the inventive backing plate that the mounting device for accommodating the spring element is an integral part of the backing plate and is already manufactured together with the backing plate while the latter is manufactured. The mounting device is then captively held on the backing plate. Therefore, no individual elements, such as screws or holding clips, need be provided so that a mounting device for a spring element can be arranged on the back side of the backing plate. This eliminates logistical expenses to procure and store these individual parts. In addition, the processing step of joining these individual parts to the backing plate on the back side is also omitted. In contrast to backing plates on which a mounting device for a spring element can subsequently be attached to its back side by means of a threaded-in retaining clip or the like, the processing step of inserting the threads for the screws into the back side of the backing plate is also omitted. The overall manufacturing costs for the backing plate with mounting device for the spring elements can be significantly reduced by the invention.

The logistical effort and also the energy expense for arranging a mounting device for a spring element on the back side of a backing plate can thus be minimized by the inventive backing plate. As a result, both the economic as well as the ecological footprint of the inventive backing plate is significantly improved compared to the backing plates known from the prior art according to the preamble of claim 1.

According to a first advantageous embodiment of the invention, the mounting device comprises at least one support element for the spring base and each of the two spring legs on the back side of the backing plate. This embodiment of the invention achieves that the spring is securely held in the shaft of the brake caliper or the brake carrier, respectively, when operating the backing plate in a brake system, wherein the support elements support the spring element under load such that the spring element can fulfill the desired spring function within the brake system, in particular as a hold-down spring.

Alternatively, only one support element can be provided for both spring legs and/or the spring base. The support element can be formed as a projection with at least one through opening or recess, similar to a hand-hold or a pocket. The support element can have two through openings, in particular bores, for inserting the spring legs.

The mounting device can comprise only one support element for the spring base and/or only one support element for a spring leg. According to an advantageous embodiment, this reduced mounting device comprises one or more of the subsequently described support and guide elements for stabilizing the associated spring.

An advantageous further embodiment of the invention provides that at least one of the support elements is formed with respect to the back side of the backing plate to have an undercut for accommodating the spring base or a spring leg of the spring element. Such undercuts once again improve the support effect and the captive positioning of the spring element within the mounting device because such undercuts grip the individual elements of the spring element, in particular the spring legs and the spring base, on multiple sides. This optimizes the captive mounting of a spring inserted in the mounting device. Such undercuts can be formed differently in this case. For example, it is conceivable that, in a particularly advantageous embodiment, the support elements have a region arranged perpendicularly on the backing plate, followed by an angular, in particular rectangular, region of the support element, which is arranged at an angle of less than 90° to the back side of the backing plate, in particular parallel to the back side of the backing plate. Another possibility of forming such undercuts is that the support elements for the spring base or the spring legs are adapted such that they have an acutely angled surface in relation to the back side of the backing plate in the region where the spring element supports itself on said support elements. The undercuts described here are particularly well suited to captively hold the spring element within the mounting device for the spring element. In principle, the undercuts can be formed such that they are adapted to the profile of the spring element. In particular, for spring elements with circular cross-sections, these undercuts can have corresponding circular segment-shaped support surfaces for the spring element.

The embodiment of the invention likewise specifies that the mounting device has a locking element associated with the support element for the spring base. This locking element forms a region between itself and the support element for the spring base in which the inserted spring element can be captively accommodated. This is in particular the case when the support elements of the spring legs have the undercuts described above. This achieves that a spring element is captively held in the mounting for the spring element on the back side of the backing plate in a displacement-proof manner.

A further advantageous embodiment of the invention provides that the mounting device has a common support and guide element for the two spring legs, wherein the mounting device is arranged on a longitudinal center axis between a backing upper side and the support elements of the two spring legs. This support element is primarily adapted such that the spring legs can under load support themselves against the support element when the backing plate is installed in a shaft of a brake caliper or a brake carrier. In addition, this support element can be adapted as a guide element when inserting the spring into the mounting device on the back side of the backing plate. While being inserted, the spring can be then guided through this support element such that this common support element of the spring legs is located between them and the spring element is now displaced such that it is guided between the support element assigned to the respective spring leg. The locking element associated with the support element of the spring base described above is then used to secure the spring within the mounting device by pushing the spring element with its spring base over this locking element. It can be provided in this case that the locking element associated with the support element for the spring base is provided with an alignment slant over which the spring element is pushed with its spring base such that the spring base is then securely held between its support element and the locking element.

Alternatively or in addition to the aforementioned common support and guide elements, additional elements can be provided, each of which is associated with a single spring leg. These further support and guide elements are preferably not arranged on the longitudinal center axis between the backing upper side and the support elements of the two spring legs. For example, the elements can be formed as projections with a cylindrical or polygonal cross-section and can optionally also have undercuts. A further advantageous embodiment of the invention provides that the spring legs are equipped with a support region at their open ends, with which the spring element supports itself on a support element of the disc brake system with a backing plate mounted in a disc brake system. This provides a contact region for the disc brake systems on the spring element, wherein these contact regions of the spring element are adapted to the disc brake system.

It is also particularly advantageous that the inventive backing plate is formed as a metal casting, preferably as an iron casting. Many of the currently used backing plates are manufactured as such iron castings. Therefore, it is not necessary to provide an entirely new manufacturing process for the casting in order to manufacture the inventive backing plate. It is sufficient to accordingly adapt the casting mold for the backing plate. Otherwise, the entire manufacturing process can remain unchanged. The use of different casting molds, which are interchanged during production, is a given anyway because different brake systems require different backing plates.

The inventive method for producing a previously described backing plate, in particular made of cast metal, has the following method steps:

a. Provide an at least two-part negative mold of a backing plate that has a negative mold for the mounting device,
b. Provide a metal melt, in particular a cast iron melt,
c. Close the at least two-part negative mold of the backing plate,
d. Fill the at least two-part negative mold of the backing plate with the melt,
e. At least partially solidify the melt within the closed negative mold of the backing plate,
f. Open the negative mold of the backing plate,
g. Remove the at least partially solidified backing plate.

The inventive method is characterized in that the negative mold of the backing plate has a negative mold for the mounting device. By this embodiment of the invention, the mounting device is manufactured as an integral part of the casting of the backing plate without the need for subsequent joining process steps to mount a corresponding mounting device on the back side of the backing plate.

In order to ensure a safe positioning of the spring element within the mounting device, it is provided that at least one of the support elements for the spring base and the two spring legs is provided with an undercut. Such undercuts are preferably generated by milling out the at least one support element. The milling can be done in such a way that the shape of the undercuts is adapted to the shape or the profile or the cross-section of the spring element such that a particularly good support effect of the spring element is achieved within the mounting device when the spring element is placed under load during operation.

A further advantageous method step can provide that the locking element and/or the common support element for the two spring legs associated with the spring base are post-processed. In particular, an alignment slant can be incorporated in the locking element associated with the spring base, said alignment slant facilitating a secure positioning of the spring element within the mounting device when inserting the spring element into the mounting device.

For the reliable functioning of the backing plate and spring element within a brake system, it is lastly provided that the spring element is inserted into the mounting device.

Alternatively, it can also be provided that the backing plate is formed as a steel plate. For example, the backing plate may be punched out of a rolled strip steel. The mounting device can be formed by a progressive transfer process, in particular by a punching process.

According to an advantageous further embodiment, the mounting device on the back side of the backing plate has dimple-like projections as support elements, in particular for supporting the spring legs, which are also referred to as dimples. In the installed position, the spring legs are preferably at least in regionally resting on the dimples.

The dimples can for example be formed in a circular shape, but can also have other shapes. The dimples can for example be formed in a semi-circular shape, wherein the undercuts can each only point to the center of the backing plate.

The inventive method for producing a previously described backing plate made of steel with dimples on the back side comprises that the mounting device of the backing plate is formed with dimple-like projections projecting to the back side of the backing plate with undercuts as support elements, formed by pressing through parts of the backing plate, wherein the dimple-like projections are formed in a first step in a forming process, and that the dimple-like projections are in a second step split and formed in the opposite direction to the forming process of the first step, thus forming the undercuts.

A rolled strip steel can be used to manufacture the backing plate. The backing plate and/or the contour thereof can, for example, be punched out of the strip steel.

Further objectives, advantages, features and applications of the present invention are derived from the subsequent description of an embodiment by way of the drawings. All described and/or depicted features per se or in any combination constitute the subject matter of the present invention, regardless of their summary in the patent claims or their back-reference.

DESCRIPTION OF THE DRAWINGS

These show in.

DETAILED DESCRIPTION

Figure 1:
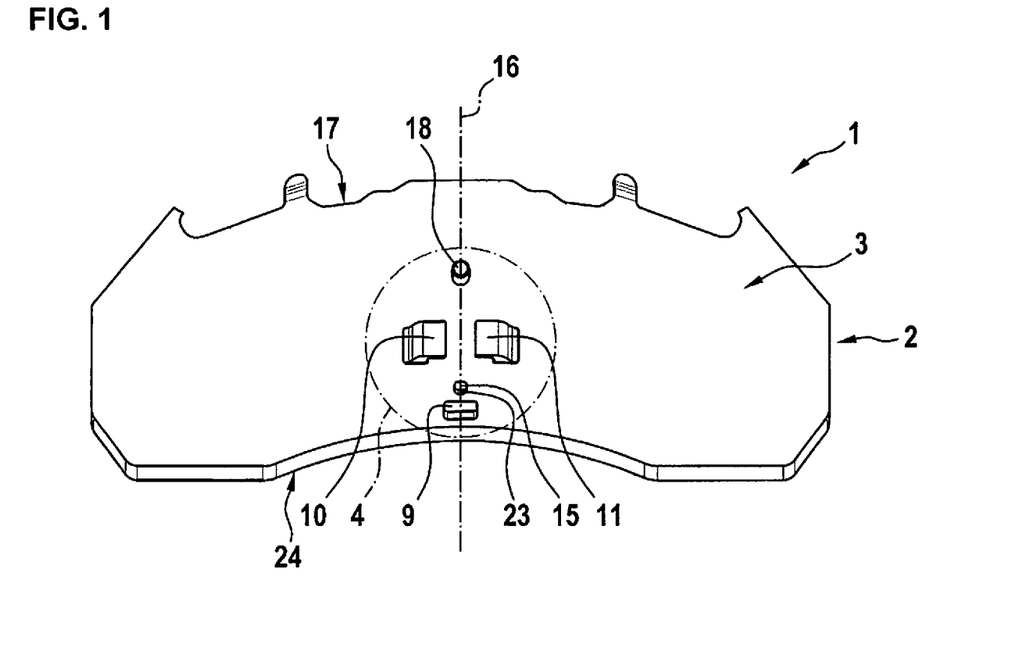
FIG. 1 a first design example of an inventive backing plate in a top view of the back side, FIG. 2 the backing plate of FIG. 1, into which a spring element is inserted, FIG. 3 the backing plate of FIG. 1 with the spring element in its final position, FIG. 4 a detailed view of the mounting device of the backing plate of FIGS. 1 to 3, and in FIG. 5 a further detailed view of the mounting device of the backing plate of FIGS. 1 to 3

FIG. 1 shows a backing plate 1 produced according to the inventive method in a top view of the back side. The backing plate 1 has a front side 2, onto which a friction pad can be applied, a back side 3, a backing plate top side 17 and a backing plate bottom side 24. A mounting device 4 for a spring element not shown in FIG. 1 is shown on the back side 3 of the backing plate 1. The mounting element 4 consists of a support element 9 for a spring base, two support elements 10 and 11 for respectively one spring leg, a common support element 18 for the spring legs, and a locking element 15 for the spring base. The locking element 15 also has an alignment slant 23 beyond which the spring base is pushed out when a spring element is inserted in order to come to rest between the locking element 15 and the support element 9.

The spring element 5 can be formed as a wire spring, as is the case in the present design example. In the present wire spring 5, the spring base 6 is a substantially semi-circular coil. This is followed by the spring legs 7, 8 extending approximately parallel to one another, in particular in the mounting device 4. An approximately U-shaped section 35 of the spring element 5 and/or the wire spring is formed by the semicircular coil and the spring legs extending in parallel. The free and/or open ends 19, 20 of the legs 7 and 8 are at least regionally angled relative to one another, in particular the free ends 19, 20 extend outward in the assembled position. Support regions 21 and 22 are also provided at the free ends 19, 20, by which the spring element 5 and/or the spring legs in their assembled state can—while in operation—support themselves against the brake system within the latter in order to enable the spring effect. The spring element 5 can approximately along its center have the transition from the U-shaped section 35 to the angled region of the legs 7, 8. In particular, the inventive backing plate 1 can have such a spring element 5, in particular a wire spring.

In this design example, the mounting device 4 is formed in a mirror-symmetrical fashion to a longitudinal center axis 16 of the backing plate 1. Both the common support element 18 for the spring legs and the locking element 15 and the support element 9 for the spring base in this case lie on this longitudinal center axis 16 in a mirror-symmetrical fashion, while the support elements 10 and 11 of the respective spring legs are separated by the longitudinal center axis 16 in a mirror-symmetrical fashion.

Figure 4:
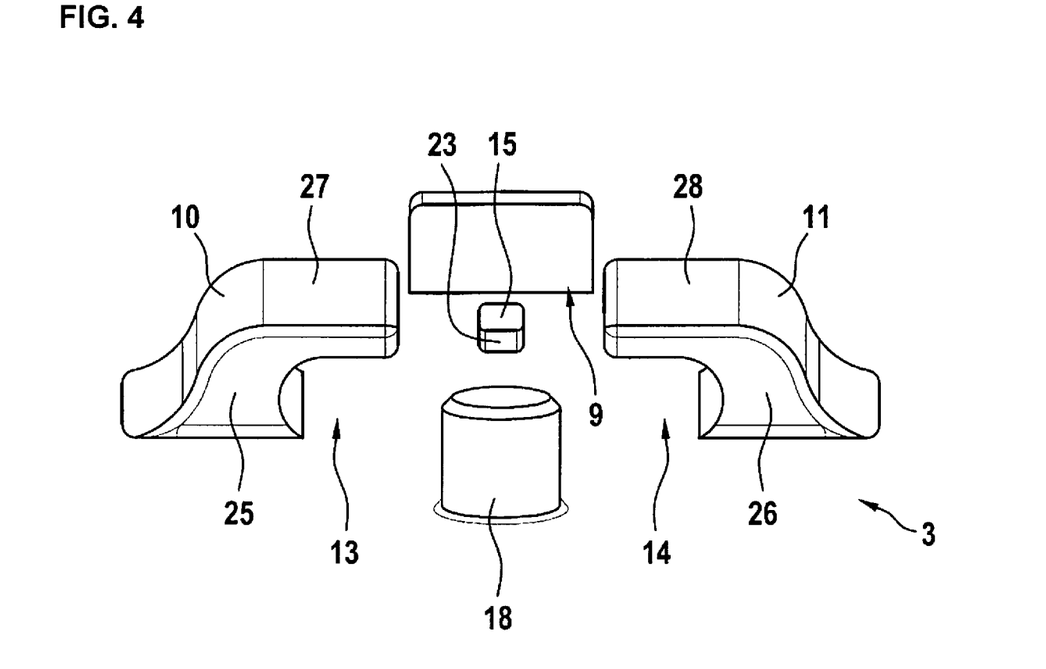

A detailed illustration of the mounting device 4 in a perspective view from the backing plate top side 17 is shown in FIG. 4. It can be seen in this case that the support element 9 for the spring base is arranged on the back side 3 of the backing plate 1 in the region of the backing plate bottom side 24. The locking element 15, which is provided with an alignment slant 23 that points away from the support element 9, is arranged adjacent to the support element 9 for the spring base. The spring base of a spring element to be inserted can be pushed over this alignment slant 23 such that the spring base can be securely positioned between the support element 9 of the spring base and the locking element 15. The locking element 15 ensures that an inserted spring element cannot be easily removed from mounting device 4. In addition, the support element 9 for a spring base can also still be provided with an undercut not incorporated here.

Furthermore, the illustration according to FIG. 4 clearly shows the two support elements 10 and 11 on the back side 3 of the backing plate 1. In the present design example, the support elements 10 and 11 each have an undercut 13, 14, into which the spring legs of the spring element come to rest when the spring element is inserted. The undercuts 13 and 14 ensure that the spring element is captively held in the inserted state in the mounting device 4 in cooperation with the locking element 15 and the support element 9 for the spring base. Lastly, FIG. 3 shows the common support element 18 (embodied in a cylindrical shape in the design example selected here) of the spring legs of the spring element.

Figure 5:
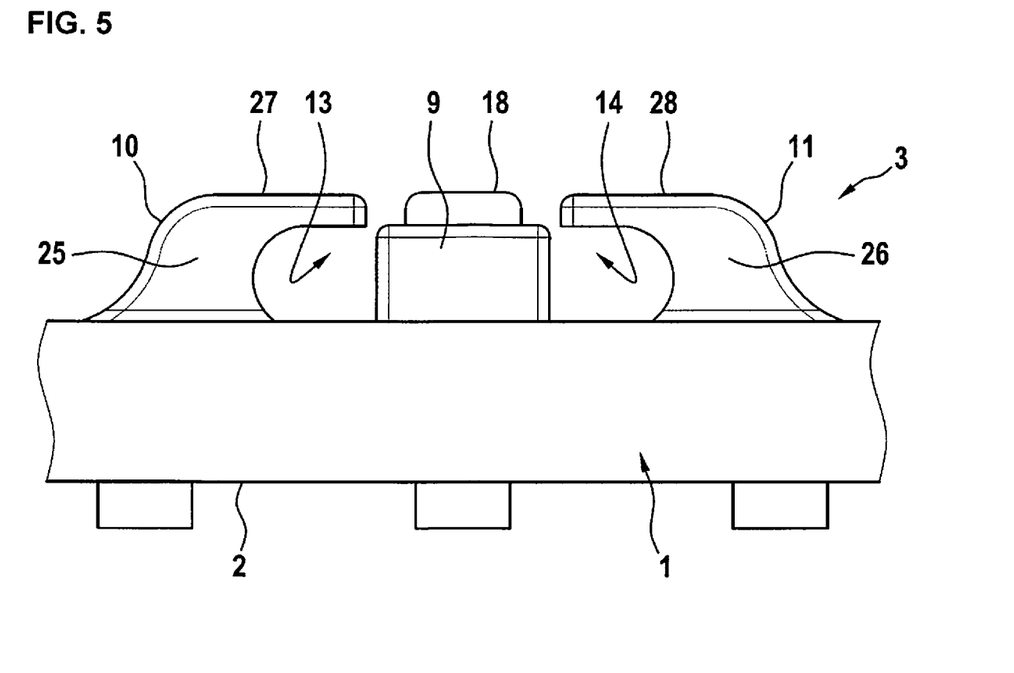

FIG. 5 shows a further detailed illustration of the mounting device 4, this time in a top view of the bottom side of the backing plate bottom side 24. In this case, the front side 2 of the backing plate 1, onto which a friction pad can be applied, can now also be seen.

The illustration according to FIG. 5 clearly shows the undercuts 13 and 14 of the support elements 10 and 11 for the spring legs of a spring element. The support elements 10 and 11 are in this case formed such that they have a web 25, 26 that is substantially perpendicular to the back side 3 of the backing plate 1, followed by a region 27, 28 extending substantially parallel to the back side 3 of the backing plate 1. The undercuts 13 and 14 are formed such that their shapes are adapted to the profile or the cross-section of a spring leg of the spring element, which is round in cross-section. Such undercuts adapted to the shape of the spring legs result in a very good support effect of the support elements 10 and 11 as well as in a secure, captive arrangement of the spring element within the mounting device 4.

Figure 2:
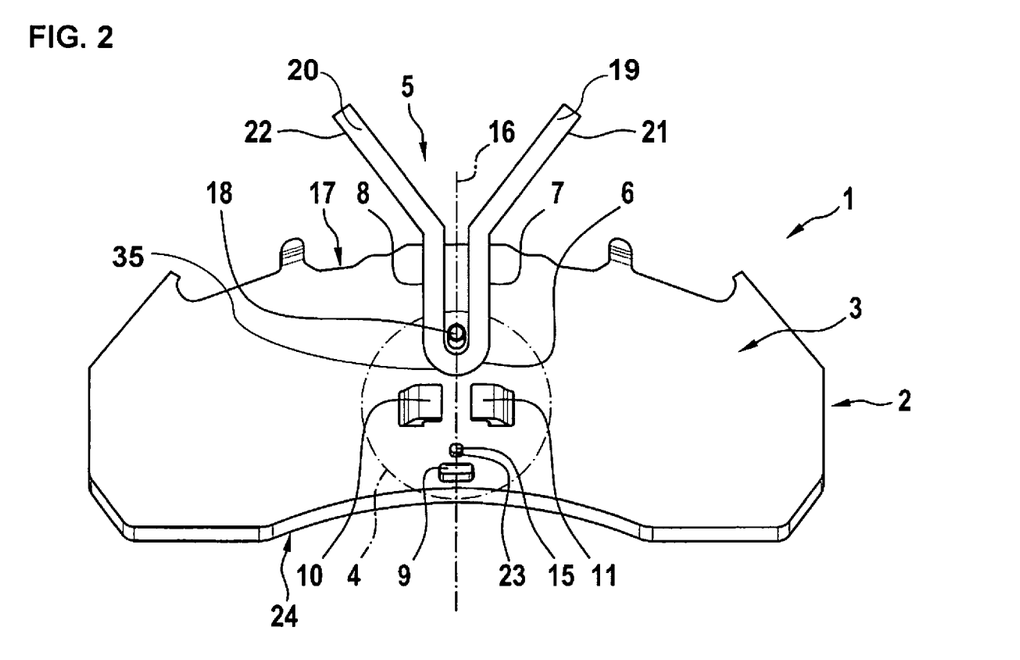
Figure 3:
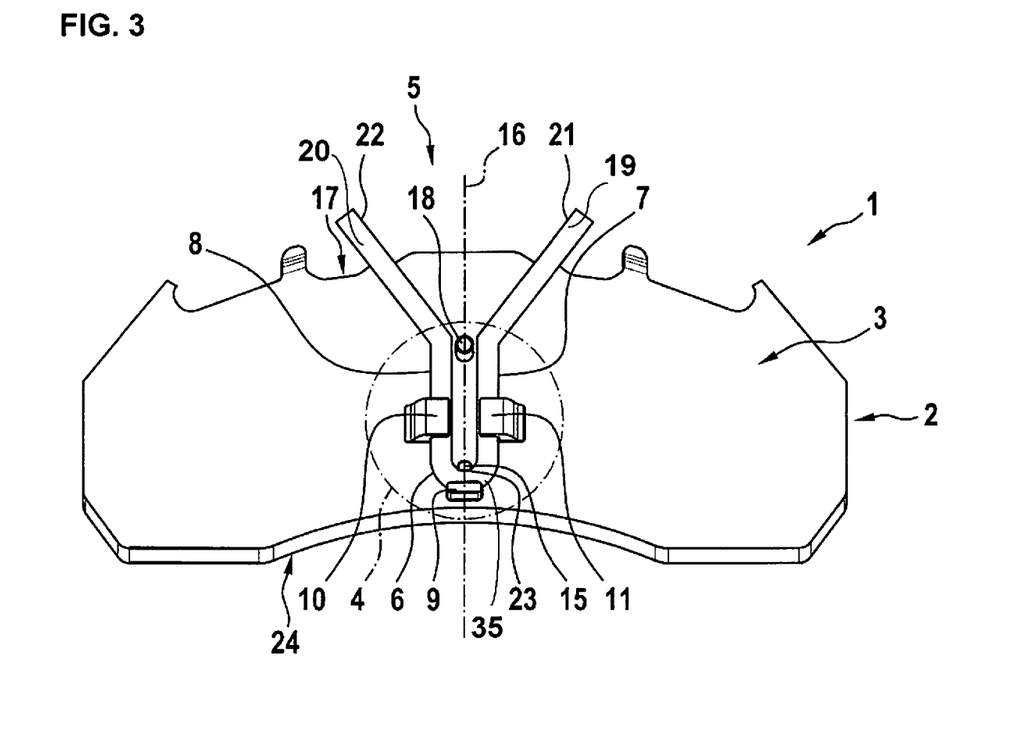

The insertion of a spring element 5 into the mounting device 4 of the backing plate 1 is now shown in FIGS. 2 and 3. The spring element 5, produced from a metal part or wire having a round cross-section, consists substantially of a rounded spring base 6, which is followed by parallel regions of spring legs 7 and 8. Support regions 21 and 22 are also arranged at the open ends 19, 20 of the legs 7 and 8, by which the spring element 5 and/or the spring legs in their assembled state can—while in operation—support themselves against the brake system within the latter in order to enable the spring effect.

As can be seen from FIG. 2, the insertion of the spring element 5 begins by positioning the spring base 6 between the common support element 18 and the respective support elements 10 and 11 of the spring legs 7 and 8, wherein the spring legs 7 and 8 are positioned opposite the common support element 18.

Subsequently, the spring element 5 is now displaced in the direction of the support element 9 for the spring base 6. The spring legs 7 and 8 are in this case positioned between their respective support elements 10 and 11. The spring element 5 is captively positioned within the mounting device 4 by now pushing the spring element 5 with its spring base 6 over the alignment slant 23 of the locking element 15 until the spring base 6 rests between its support element 9 and the locking element 15. While the spring base 6 is displaced on the alignment slants 23 of the locking element 15, a stress is built up within the spring element 5, which is again relieved when the spring base 6 is pushed over the alignment slant 23 and the locking element 15. The spring base 6 in this case springs into the space between the locking element 15 and the support element 9 of the spring base 6. The spring base 6 is therefore now securely and captively held in the mounting device 4 for the spring element 5 because the locking element 15 prevents the spring element 5 from retracting, while the undercuts 13 and 14 of the support elements 10 and 11 of the spring legs 7 and 8 make it impossible for the spring element 5 to pivot out of the mounting device 4.

In operation within a brake system, the spring element 5 can now support itself with its spring legs 7 and 8 under load on the common support element 18, wherein the backing plate 1 is thereby held in position. The spring element 5 is in this case adapted as a hold-down spring for the backing plate 1.

Figure 6:
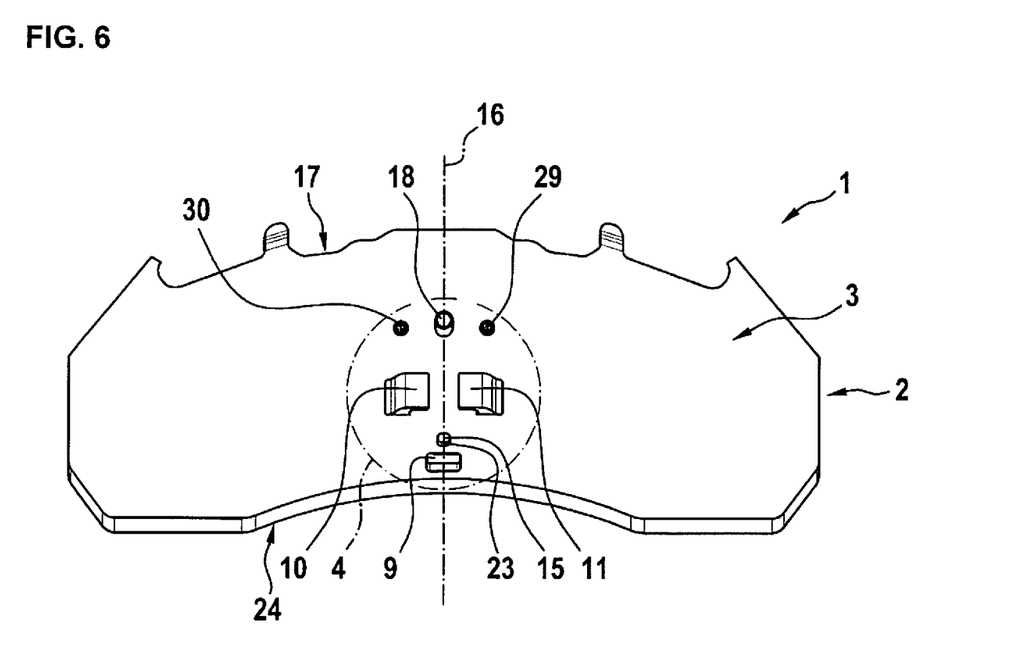
FIG. 6: a second design example of an inventive backing plate in a top view onto the back side, FIG. 7 the backing plate of FIG. 6, into which a spring element is inserted, FIG. 8 the backing plate of FIG. 6 with the spring element in its final position, FIG. 9 a third embodiment according to FIGS. 6 to 8, but without support element, FIG. 10 a fourth design example according to FIGS. 1 to 5, but without a support element, FIGS. 11-13 a fifth design example of the backing plate with dimple-like projections and support elements, FIG. 14 the embodiment according to FIGS. 11-13 as a cross-sectional representation by the cross-section line according to FIG. 11, FIG. 15 a sixth design example of the backing plate with dimple-like projections, but without support elements, FIG. 16 the embodiment according to FIG. 15 as a cross-sectional representation, and in FIG. 17 the embodiment according to FIGS. 15 and 16 as an enlarged section of the representation according to FIG. 16.
Figure 7:
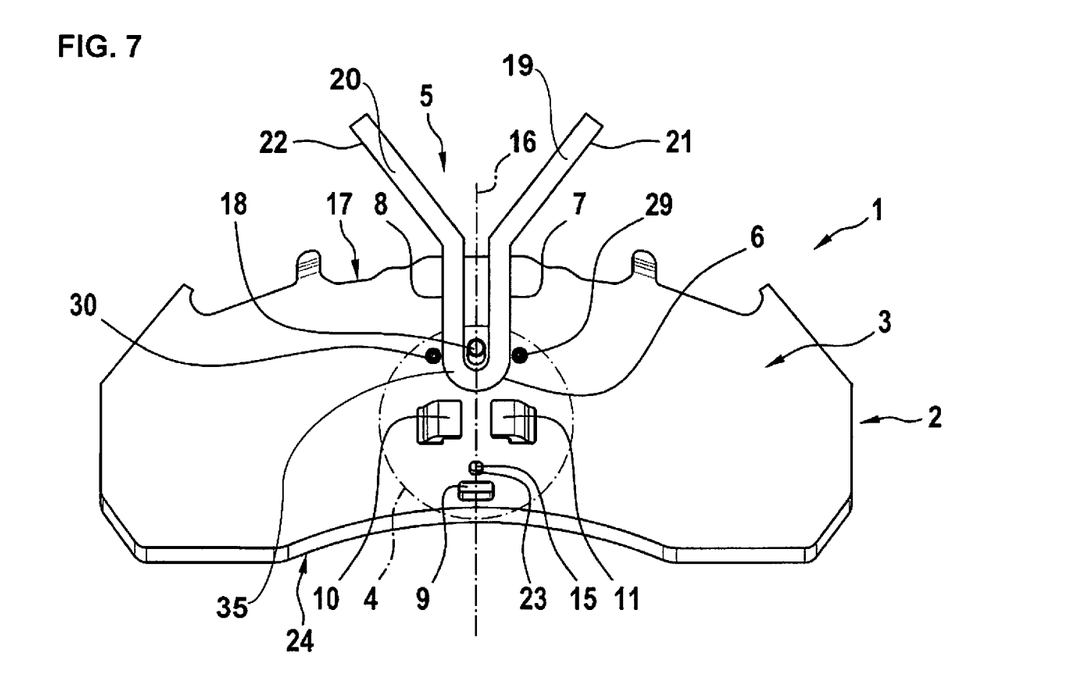
Figure 8:
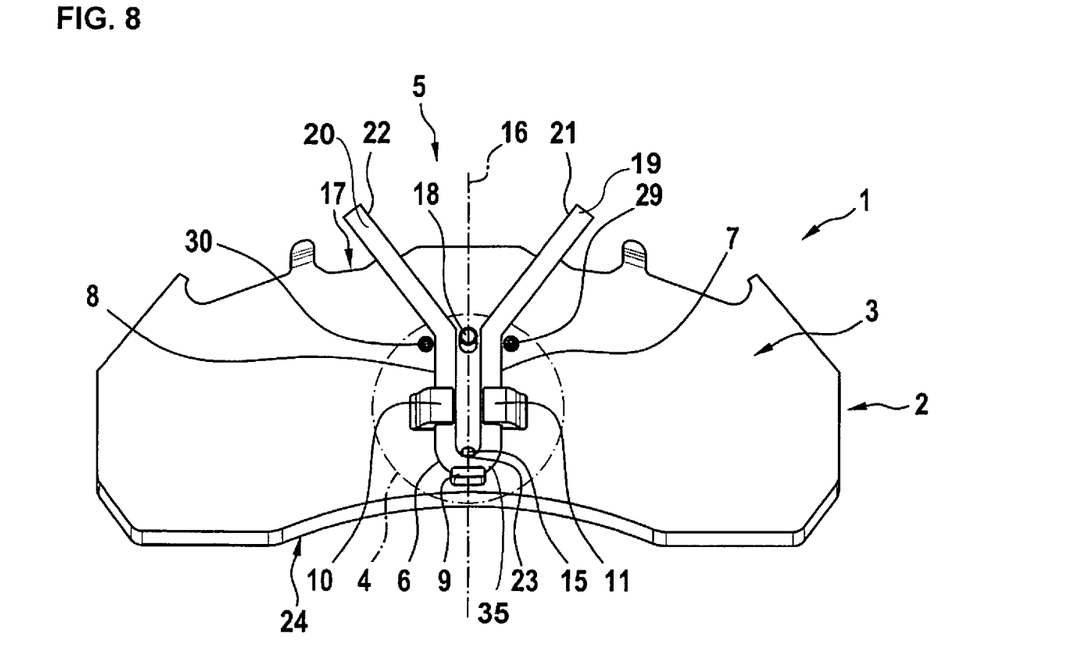

FIGS. 6 to 8 show a second design example of a backing plate 1 according to the invention, which essentially corresponds to the first design example of FIGS. 1 to 6. However, in contrast to the first design example, a further support element 29 and 30 is provided for the spring legs 7 and 8, respectively, which is arranged above the support and guide element 18 between the latter and the backing upper side 17. However, in contrast to the support elements 10 and 11 of the spring legs 7 and 8, the support elements 29 and 30 do not have undercuts. However, further exemplary embodiments are also conceivable, wherein the support elements 29 and 30 are also provided with undercuts.

In the design example of FIGS. 6 to 8, the support elements 29 or 30 with the respectively assigned support element 10 or 11, respectively, of the spring legs 7 and 8 are designed substantially aligned in reference to the longitudinal center axis 16 and mirror-symmetrically to the longitudinal center axis 16. Further exemplary embodiments can also provide that the support elements 29 and 30 have a larger or smaller distance with regard to the longitudinal center axis 16 than the support elements 10 and 11 and thus do not align with them, but still have mirror symmetry to the longitudinal center axis 16.

Figure 9:
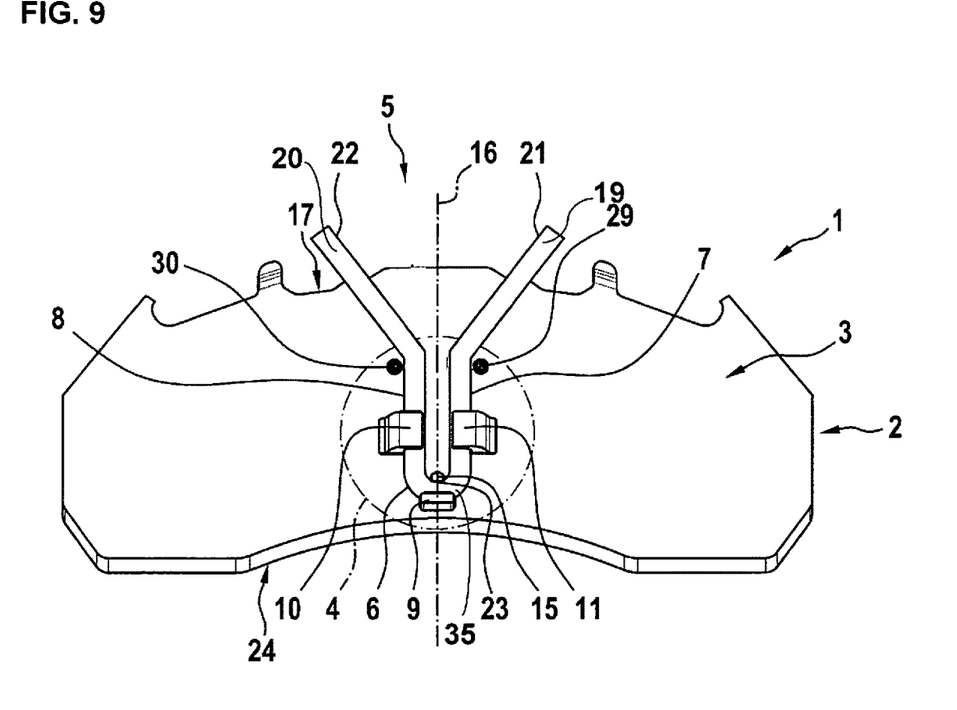

FIG. 9 shows a third design example of an inventive backing plate 1 that substantially corresponds to the second design example of FIGS. 6 to 8. However, in contrast to the second design example, no support element 18 is provided for the spring legs 7, 8.

Figure 10:
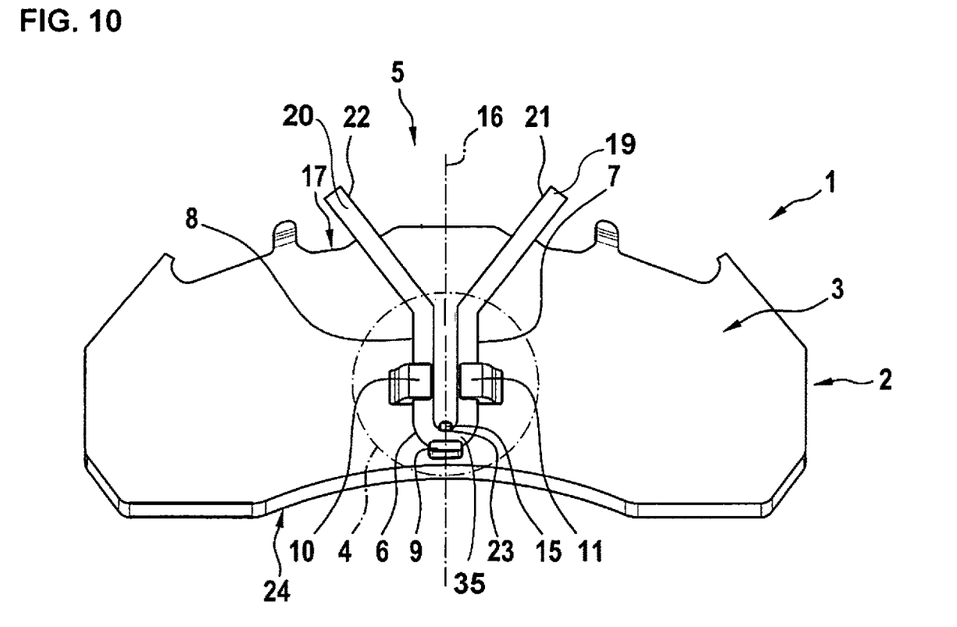
Figure 11:
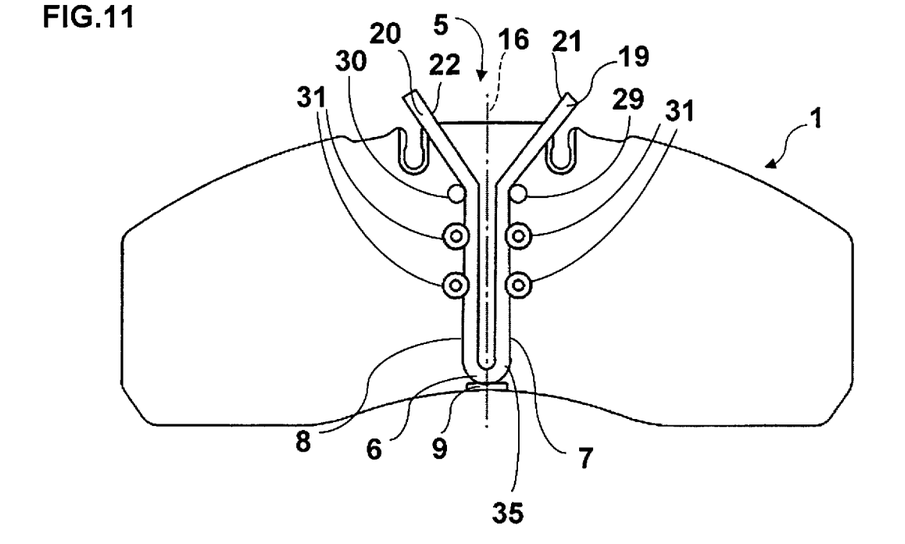
Figure 12:
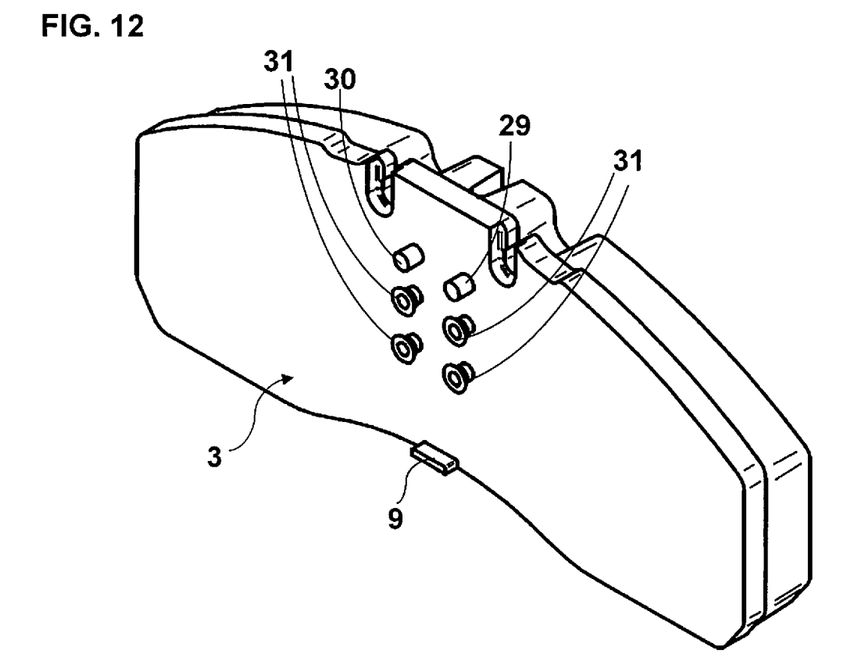
Figure 13:
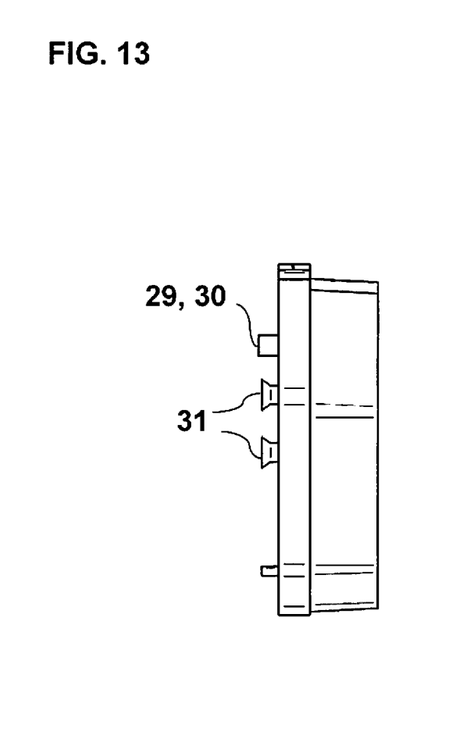

FIG. 10 shows a fourth design example of the inventive backing plate 1 that substantially corresponds to the first design example according to FIGS. 1 to 5, although no support element 18 is provided for the spring legs 7, 8.

Figure 14:
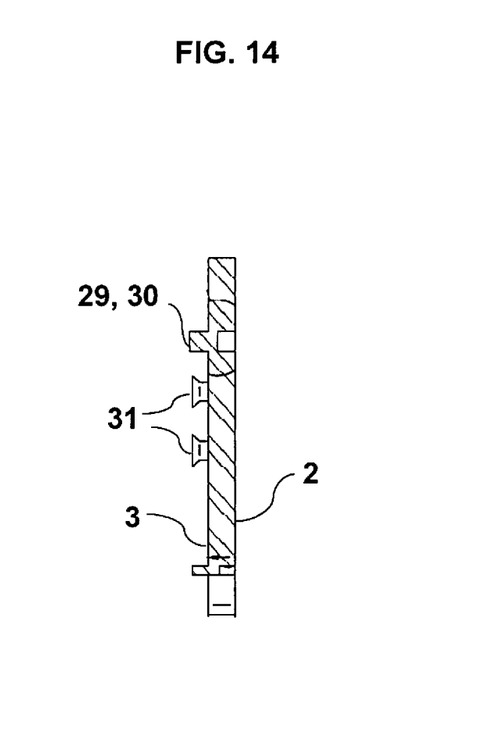

FIGS. 11 to 14 show a fifth design example of the inventive backing plate 1, wherein the backing plate 1, substantially manufactured from steel, in the present example comprises a mounting device 4 with four dimple-like projections 31 adapted as support elements, which are also referred to as dimples. A different number of dimples 31 is of course also conceivable. The dimples 31 are provided on the back side 3 of the backing plate 1. The spring legs 7, 8 are at least regionally abut the dimples 31. As can be further seen from FIGS. 11 to 13, this exemplary embodiment also provides support elements 29 and 30 for the spring legs 7, 8. FIG. 14 shows a cross-sectional representation through the centerline according to FIG. 11.

Figure 15:
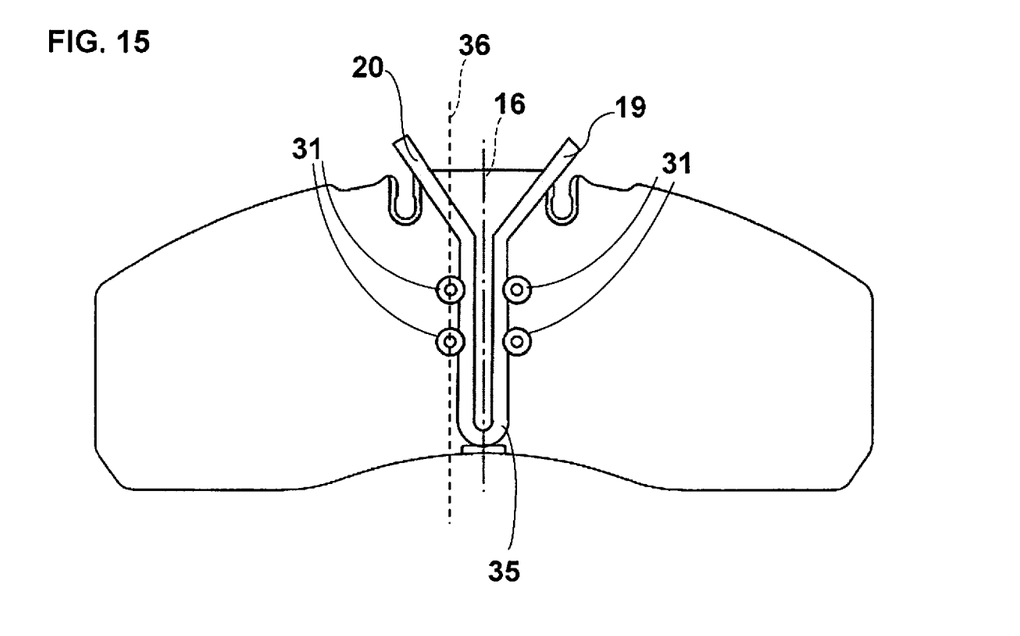
Figure 16:
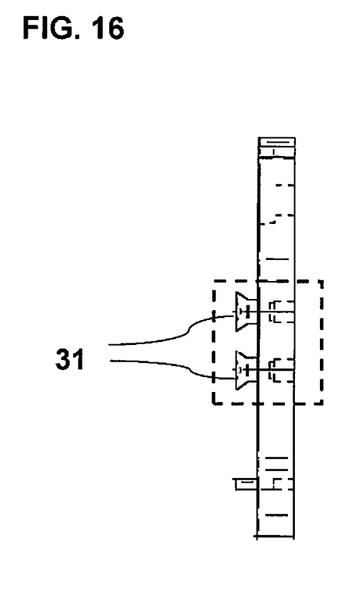
Figure 17:
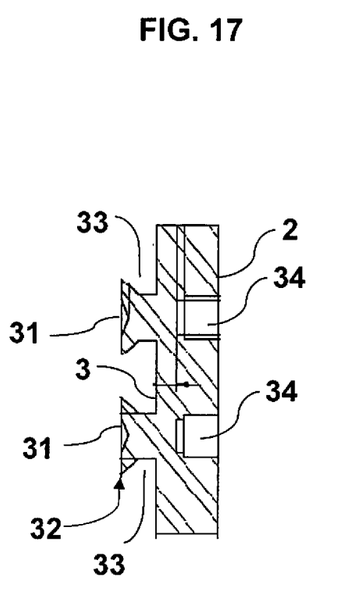

The sixth design example according to FIGS. 15 to 17 differs from the fifth design example in that the inventive backing plate 1 does not provide for lateral support elements 29 and 30 for the spring legs 7, 8. The backing plate 1, produced substantially from steel, has a plurality, in this case four, dimples 31 on which each spring leg 7, 8 rests at least regionally. FIG. 16 is a cross-sectional view according to the cross-section line 36 through the dimples 31 in FIG. 15, and an enlarged cross-section of the view according to FIG. 16 can be seen in FIG. 17.

As can be seen in particular from the enlarged illustration according to FIG. 17, the dimple-like projections 31 are formed as push-throughs and are therefore integral with the carrier plate 1.

The dimple-like projections or dimples 31, respectively, are produced by pressing through several circular dimples, for example with a diameter of approx. 6 mm, using a tool with a concave-shaped tip from the front side 2 of the carrier plate 1 such that a plurality of dimples 31 project from the carrier plate surface on the back side 3. In general, the ratio of the dimple diameter to the carrier plate thickness can be between 1 and 2, preferably slightly above 1.

In a second method step, a tool is pressed in the opposite direction against the projecting dimples 31 in order to split the dimples 31 in a further forming process and to form projections 32 with undercuts 33 from the dimples 31. A tool with a pyramidal tip can be used for this purpose, which facilitates the splitting of the dimples 31. Conical tip tools may also be used, but those with a pyramidal tip are preferred.

As can be further seen from FIG. 17, the strong undercuts 33, with which the friction pad can be anchored on the carrier plate 1 such that high shearing forces can be absorbed, are formed by splitting the projections 32. Circular recesses 34 remain on the front side 2 of the carrier plate 1, for example with a depth of 2 to 3 mm, the bottoms of which can have a convex curvature.

When pressing the friction pads onto the carrier plate 1, the friction material of the friction pad can penetrate the undercuts 33 and firmly anchor itself there.

REFERENCE NUMERALS

1 Backing plate
2 Front side
3 Back side
4 Mounting device
5 Spring element
6 Spring base
7 Spring leg
8 Spring leg
9 Support element
10 Support element
11 Support element
13 Undercut
14 Undercut
15 Locking element
16 Longitudinal center axis
17 Backing plate top side
18 Support and guide element
19 End
20 End
21 Support region
22 Support region
23 Start-up slant
24 Backing plate bottom side
25 Web
26 Web
27 Region
28 Region
29 Support element
30 Support element
31 Dimple-like projections
32 Projections
33 Undercuts
34 Circular recesses
35 U-shaped section
36 Cross-section line

The invention claimed is:

1. A backing plate (1) for a disc brake of a motor vehicle, comprising:
a front side (2) adapted to accommodate a friction pad,
a back side (3) opposite the front side (2),
a mounting device (4) arranged on the back side (3) and integrally formed with the backing plate (1) and/or integrally bonded to the backing plate (1), which mounting device (4) is adapted to accommodate a spring element (5) comprised of a spring base (6) and two spring legs (7, 8) arranged at the ends of the spring base (6), wherein the mounting device (4) comprises at least one support element (9, 10, 11, 29, 30, 31) for the spring base (6) and each of the two spring legs (7, 8), and wherein at least one of the support elements (9, 10, 11, 29, 30, 31) has an undercut (13, 14, 33) in relation to the back side (3) of the backing plate (1) to accommodate the spring base (6) or a spring leg (7, 8) of the spring element (5), and wherein the mounting device (4) further comprises a common support and guide element (18) for the two spring legs (7, 8) arranged on a longitudinal center axis (16) between a backing upper side (17) and the support elements (10, 11) of the two spring legs (7, 8).

2. The backing plate according to claim 1, wherein the mounting device (4) further comprises a locking element (15) assigned to the support element (9) for the spring base (6).

3. The backing plate according to claim 1, wherein the backing plate is formed as a metal casting.

4. The backing plate according to claim 3, wherein the backing plate is formed as an iron casting.

5. The backing plate according to claim 1, wherein the backing plate is formed as a steel plate, and wherein the mounting device (4) is formed by a progressive transfer process such as a punching process.

6. The backing plate according to claim 5, wherein the mounting device (4) comprises support elements (31) embodied as dimple-like projections (31) for supporting the spring legs (7, 8) and/or the spring base (6).

7. A method for manufacturing a backing plate (1) according to claim 6, wherein the mounting device (4) of the backing plate (1) is formed with dimple-like projections (31) with undercuts (33) adapted as support elements (31), wherein the dimple-like projections (31) are formed by pushing through parts of the backing plate (1) to the back side (3) of the backing plate (1), and wherein the dimple-like projections (31) are formed in a forming process in a first step, and in that the dimple-like projections (31) are in a second step split and formed in the opposite direction to the forming process of the first step, so as to form the undercuts (33).

8. The method according to claim 7, wherein a rolled strip steel is used to manufacture the backing plate (1).

9. The backing plate according to claim 1, wherein the spring element (5) is formed as a wire spring.

10. A method for manufacturing a backing plate (1) according to claim 1, comprising the steps of:
a. providing an at least two-part negative mold of a backing plate (1), which has a negative mold for the mounting device (4),
b. providing a metal melt,
c. closing the at least two-part negative mold of the backing plate (1),
d. filling the at least two-part negative mold of the backing plate (1) with the melt,
e. at least partially solidifying the melt within the closed negative mold of the backing plate (1),
f. opening the negative mold of the backing plate (1), and
g. removing the at least partially solidified backing plate (1),
wherein the support elements (9, 10, 11, 29, 30, 31) of the mounting device (4) are integrally formed on the back side (3) of the backing plate (1), wherein at least one of the support elements (9, 10, 11, 29, 30, 31) for the spring base (6) and the two spring legs (7, 8) is provided with an undercut (13, 14), and wherein the common support and guide element (18) is integrally formed on or applied onto the back side (3) of the backing plate (1).

11. The method according to claim 10, further comprising: h milling out the at least one support element (9, 10, 11, 29, 30, 31) to generate the undercut (13, 14).

12. The method according to claim 10 wherein the locking element (15) associated with the spring base (6) and/or the common support element (18) for the two spring legs (7, 8) is/are post-processed.

13. The method according to claim 10 wherein a spring element (5) is introduced into the mounting device (4).

* * * * *